United States Patent [19]

Fujieda et al.

[11] Patent Number: 5,164,199

[45] Date of Patent: Nov. 17, 1992

[54] BLADDER, BLADDERLESS-TYPE DUAL-PURPOSE TIRE VULCANIZER

[75] Inventors: Yasuhiko Fujieda, Akashi; Senzo Funakoshi, Kobe, both of Japan

[73] Assignee: Kabushiki Kaisha Kobe Seiko Sho, Kobe, Japan

[21] Appl. No.: 663,176

[22] Filed: Mar. 1, 1991

[30] Foreign Application Priority Data

Mar. 3, 1990 [JP] Japan .................. 2-52346

[51] Int. Cl.$^5$ .............................................. B29C 35/02
[52] U.S. Cl. ........................................ 425/33; 425/36; 425/44; 425/48; 425/51; 425/182; 425/183
[58] Field of Search ............... 425/34.1, 35, 36, 48, 425/51, 182, 183, 33, 36, 44

[56] References Cited

U.S. PATENT DOCUMENTS

| | | | |
|---|---|---|---|
| 3,918,861 | 11/1975 | Klose | 425/34.1 |
| 4,181,483 | 1/1980 | Pech et al. | 425/44 |
| 4,236,883 | 12/1980 | Turk et al. | 425/36 |
| 4,400,342 | 8/1983 | Logan | 425/44 |
| 4,721,446 | 1/1988 | Ichikawa | 425/44 |

*Primary Examiner*—Willard E. Hoag
*Attorney, Agent, or Firm*—Oblon, Spivak, McClelland, Maier & Neustadt

[57] ABSTRACT

A bladder bladderless-type dual-purpose tire vulcanizer wherein a lower center mechanism for the bladder type and a lower center mechanism for the bladderless type are interchangeably mounted on a lower platen which supports a lower half of a mold. An upper center mechanism for the bladderless type is vertically movably mounted, between an operating position and an upper waiting position, on an upper plate which supports an upper half of the mold. An upper bead ring for the bladder type and an upper bead ring for the bladderless type are interchangeably mounted on the upper half of the mold. Furthermore the lower center mechanism is provided with a lower bead ring, and upper and lower domes for enclosing and clamping the upper and lower platens.

3 Claims, 7 Drawing Sheets

BLADDER, BLADDERLESS-TYPE DUAL-PURPOSE TIRE VULCANIZER

BACKGROUND OF THE INVENTION

1. Industrial Field of Utilization

This invention relates to a bladder.bladderless-type dual-purpose tire vulcanizer.

2. Description of Prior Art

There are present two types of tire vulcanizers: A bladder type and a bladderless type. Nowadays most of the tire vulcanizers in practical use for voluminous production of tires are the bladder type using a bladder.

The bladder-type tire vulcanizer uses the bladder which is a consumable part, and has such a problem that tire quality is deteriorated because of the ununiformity of bladders. The bladderless type, on the other hand, using no bladder, does not have this problem and therefore is much more advantageous in this respect than the bladder type.

There have been proposed various types of bladderless-type tire vulcanizers, which have been confirmed to be smoothly operable. From this point, the bladderless-type tire vulcanizer has been confirmed to have various advantages.

For the practical use of the bladderless-type tire vulcanizer and for transfer to the mass production of tires, there still exist various many problems to be solved. It is therefore necessary to amass technical knowhow regarding operation. After the accumulation of the knowhow, the tire vulcanizer will be switched from the bladder type over to the bladderless type.

Conventional bladder- and bladderless-type tire vulcanizers are built and used totally separately as differen machines. When the bladderless-type tire vulcanizer is adopted in future, it will become necessary to discard existing bladder-type tire vulcanizes. Since the average life time of the existing tire vulcanizer is around 20 years, it will become difficult from an economic point of view to change despite of the advantages of the bladderless type.

SUMMARY OF THE INVENTION

The present invention has been accomplished in an attempt to solve the problems mentioned above. And it is an object of the present invention to provide a bladder.bladderless-type dual-purpose tire vulcanizer which can be switched over from the bladder type to the bladderless type simply by replacing part of the machine.

The tire vulcanizer according to the present invention is of such a construction that a lower center mechanism 44 for the bladder type and a lower center mechanism 11 for the bladderless type are interchangeably mounted on a lower platen 4 supporting a lower half 3 of a mold; an upper center mechanism 26 for the bladderless type is vertically movably mounted, between an operating position and an upper waiting position, on an upper plate 23 supporting an upper half of the mold 22; and on the upper half 22 are interchangeably mounted an upper bead ring 48 for bladder type and an upper bead ring 29 for bladderless type.

When the tire vulcanizer is changed from the bladder type to the bladderless type, the lower center mechanism 11 of the lower plate 4 should be replaced. In the case of the bladderless type, the upper center mechanism 26 is lowered to the operating position in which the upper and lower bead sections of a green tire 2 are held under pressure, by means of the upper center mechanism 26 and the lower center mechanism 11.

In the case of the bladder type, on the other hand, the upper center mechanism 26, being unnecessary, is moved upwardly as high as the waiting position, and the upper bead ring 48 for the bladder type is attached to the upper half 22. Other features and advantages of the present invention will become apparent from the following description of an embodiment of this invention, together with the accompanying drawings.

BRIEF DESCRIPTION OF THE DRAWINGS

The drawings show a bladder/bladderless-type dual-purpose tire vulcanizer according to one embodiment of the present invention, wherein:

FIG. 1 is a sectional view showing one embodiment of the

DESCRIPTION OF THE PREFERRED EMBODIMENT

Hereinafter one embodiment of a bladder/bladderless-type dual-purpose tire vulcanizer according to the present invention will be described in detail with reference to the accompanying drawings.

Figure 1:
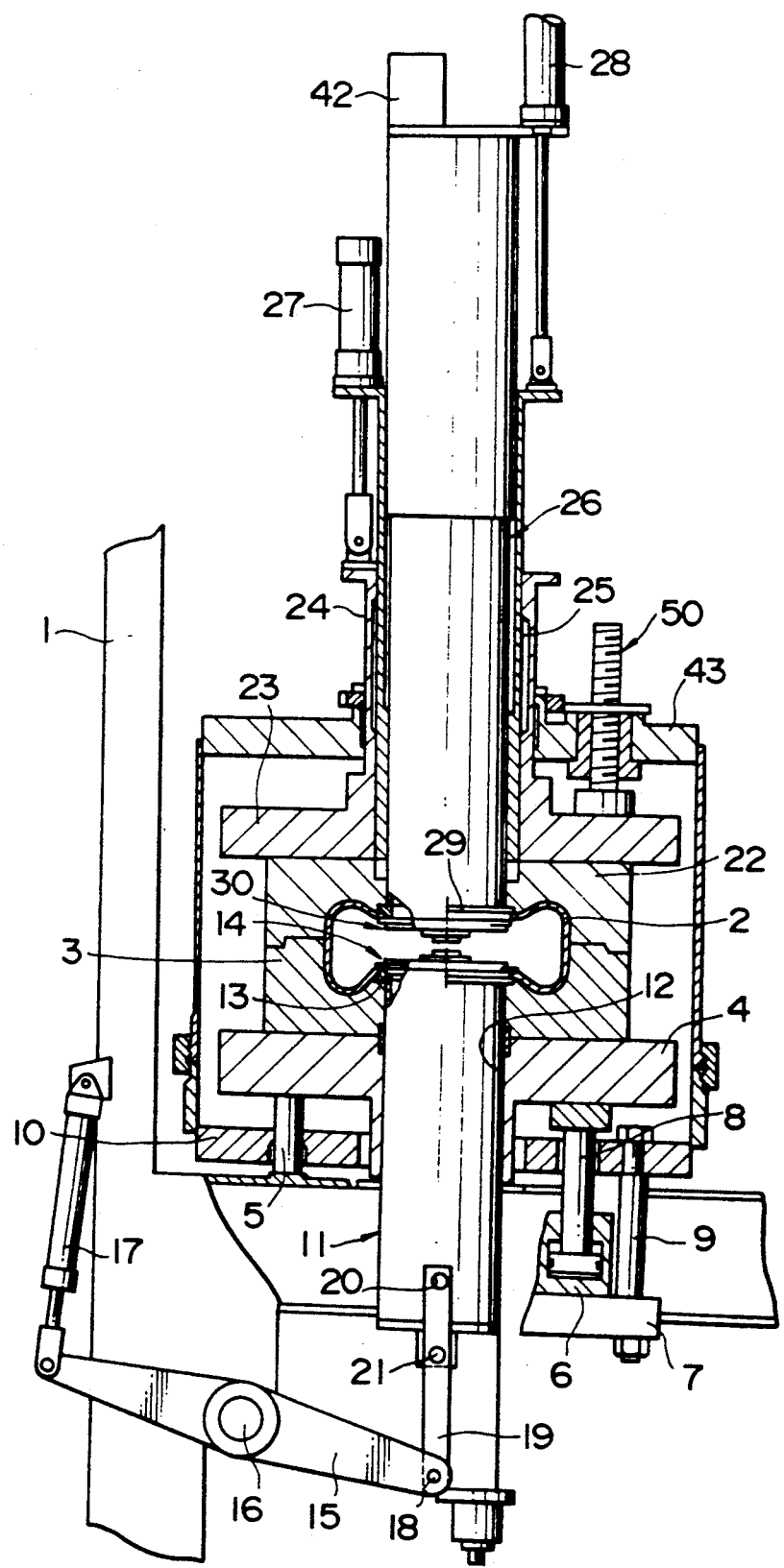

FIG. 1 shows the tire vulcanizer used as a bladderless type vulcanizer. In this drawing, numeral 1 is a body frame of the vulcanizer and numeral 2 denotes a green tire. Numeral 3 denotes a lower half of a mold and numeral 4 denotes a lower platen supporting the lower half 3 of the mold and mounted on the body frame 1 through a guide member 5. Numeral 6 is a clamping cylinder, which is mounted on a cylinder plate 7. A piston rod 8 of this clamping cylinder 6 is secured on the lower side of the lower platen 4. The cylinder plate 7 is connected to a lower clamp dome 10 through a tie rod. Numeral 11 represents a lower center mechanism for the bladder type, which is vertically slidably and removably mounted in a mounting bore 12 formed in the center of the lower platen 4. At the top end section of this lower center mechanism 11 are installed a lower bead ring 13 and a lower sector plate 14 between which the lower bead section of the green tire 2 are held under pressure. The lower sector plate 14, as described later, has two kinds of large and small sectors divided in a circumferential direction into a plurality of segments, each sector being vertically movably and expansibly constituted. Numeral 15 is a lift arm which moves the lower center mechanism 11 up and down, and is pivotally attached on the body frame 1 by means of a pivot shaft 16. To one end of this lift arm 15 is connected a lift cylinder 17 attached on the body frame 1, and to the other end is connected a link 19 by a pin 18. The link 19 is provided with two bolt holes 20. In the case of the bladderless type, the link 19 is connected by a bolt 21 inserted in the bolt hole 20 to the lower center mechanism 11.

Numeral 22 is an upper half of the mold, and numeral 23 denotes an upper platen supporting this upper half 22. The upper platen 23 has a guide tube section 24 at the center. Inside of this guide tube section 24 are relatively vertically movably inserted a split mold operating shaft 25 and an upper center mechanism 26 for bladderless type. Between the top end of the split mold operating shaft 25 and the top end of the guide tube 24 is installed a split mold operating cylinder 27 for raising and lowering the split mold operating shaft 25 in relation to the upper platen 23. Between the top end of the upper center mechanism 26 and the top end of the split mold operating shaft 25 is installed an upper center mechanism lift cylinder 28 for vertically moving the upper center mechanism 26 between the operating position and the upper waiting position.

Figure 2:
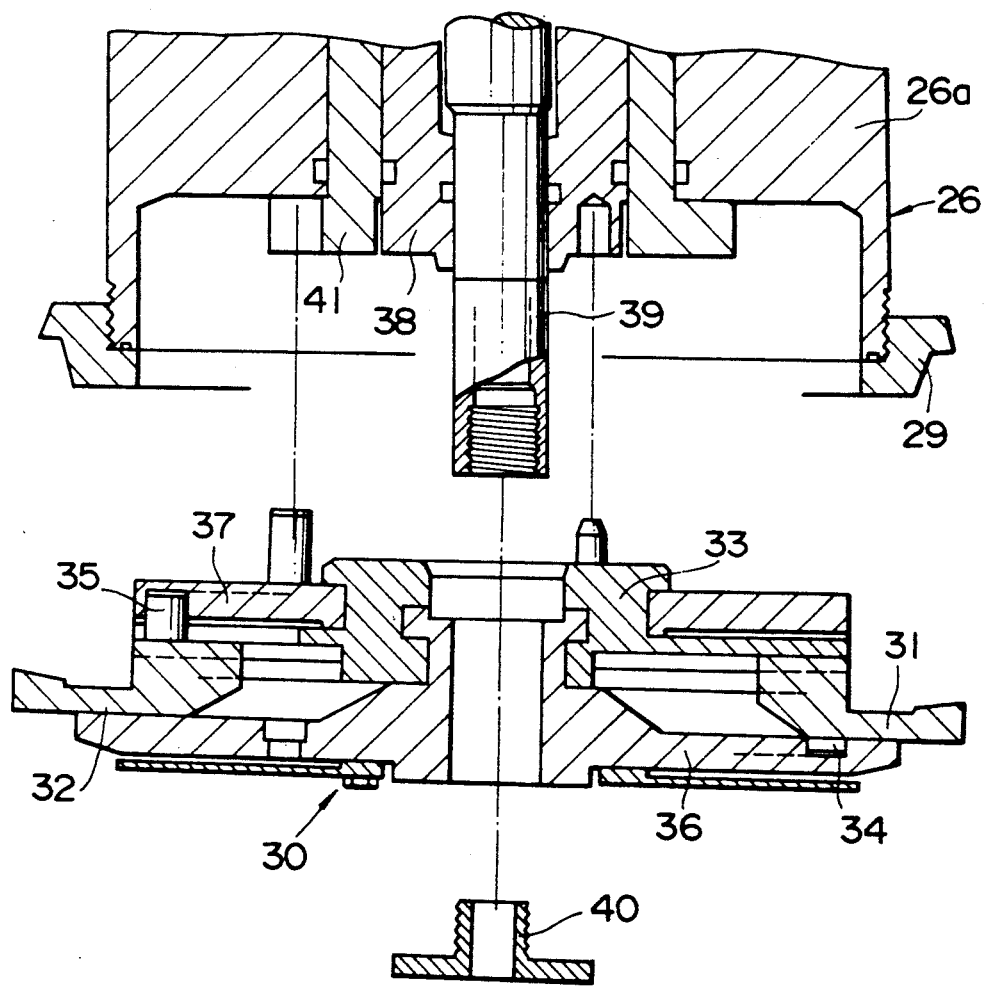
FIG. 2 is a partially sectional view of a lower section of an upper center mechanism.

At the bottom end of the upper center mechanism 26 are installed an upper bead ring 29 and an upper sector plate 30 which holds under pressure the upper bead section of the green tire 2 between the upper bead ring 29 and the upper plate 30. The upper bead ring 29, as shown in FIG. 2, is removably screwed into the bottom end of an outer tube 26a. The upper sector plate 30, as shown in FIG. 2, is divided in a circumferential direction into a plurality of segments and has a large sector 31 and a small sector 32 alternately arranged. These sectors 31 and 32 are expansibly supported in the diametral direction by the support plate 33 and interlocked with cam plates 36 and 37 through cam followers 34 and 35. The support plate 33 is removably attached to the bottom end of the lift shaft 38, while the cam plate 36 is also removably attached by a nut 40 to the bottom end of the rotating shaft 39. The cam plate 37 is mounted on a tubular shaft 41. These shafts 39 and 41 are each connected to a motor 42, such that when the motor is turned normally or reversely, the cam plates 36 and 37 will be turned through the shafts 39 and 40, and the sectors 31 and 32 will be expanded or contracted through the cam followers 34 and 35. The lower sector plate 14 side also is nearly similarly constituted.

Numeral 43 denotes an upper clamp dome, and numeral 50 is an adjusting screw mechanism. The upper platen 23 side is vertically movably mounted on the body frame 1. The lower bead ring 13 is of a dual-purpose type, and removably mounted on the outer tube of the lower center mechanism 11.

Next, one example of a green tire vulcanizing method will hereinafter be explained. This vulcanizing method comprises inserting a green tire into a pair of opening-and-closing type split molds to form an enclosed space including a tire body interior, raising a gas hot-press medium to a required temperature by means of a heating apparatus before the supply of the hot-press medium to the enclosed space in the bladderless vulcanization of tires through the direct application of the hot-press medium to the enclosed space, and continuously supplying this gas hot-press medium to the enclosed space through pressure supply and exhaust lines and a stirring-circulating means, thereby vulcanizing the green tire by the bladderless-type tire vulcanizer.

According to this method, for example prior to feeding a CO or N inactive gas into the enclosed space, the hot-press medium is heated to a required temperature by a heating apparatus installed outside; this hot-press medium is continuously supplied into the enclosed space through the pressure supply and exhaust lines connected to the inside and outside of the enclosed space including the green tire body charged in the split mold which can be opened and closed; and this hot-press medium is stirred and circulated in the enclosed space into positive contact with the inner surface of the green tire, thereby positively and easily enabling uniform vulcanization of tires with the gas hot-press medium. That is, it is possible to vulcanize each part of the green tire uniformly.

Furthermore, because of the above-mentioned structure, the interior of the enclosed space, with the stirring and circulating means excluded, can be left as a free space, hence enabling the provision of a fully wide space therein due to for example a hermetically sealed structure of the green tire. Furthermore, it is possible to distribute a gas hot-press medium controlled at a specific temperature, from a gas heating apparatus mounted on the outside of the press of each vulcanizer, directly to the vulcanizer, or from one independent heating apparatus to many vulcanizer, and also to ensure extremely easy temperature control.

Next, an embodiment of the heating means for vulcanization according to this method will be explained with reference to FIGS. 3 and 4.

Figure 3:
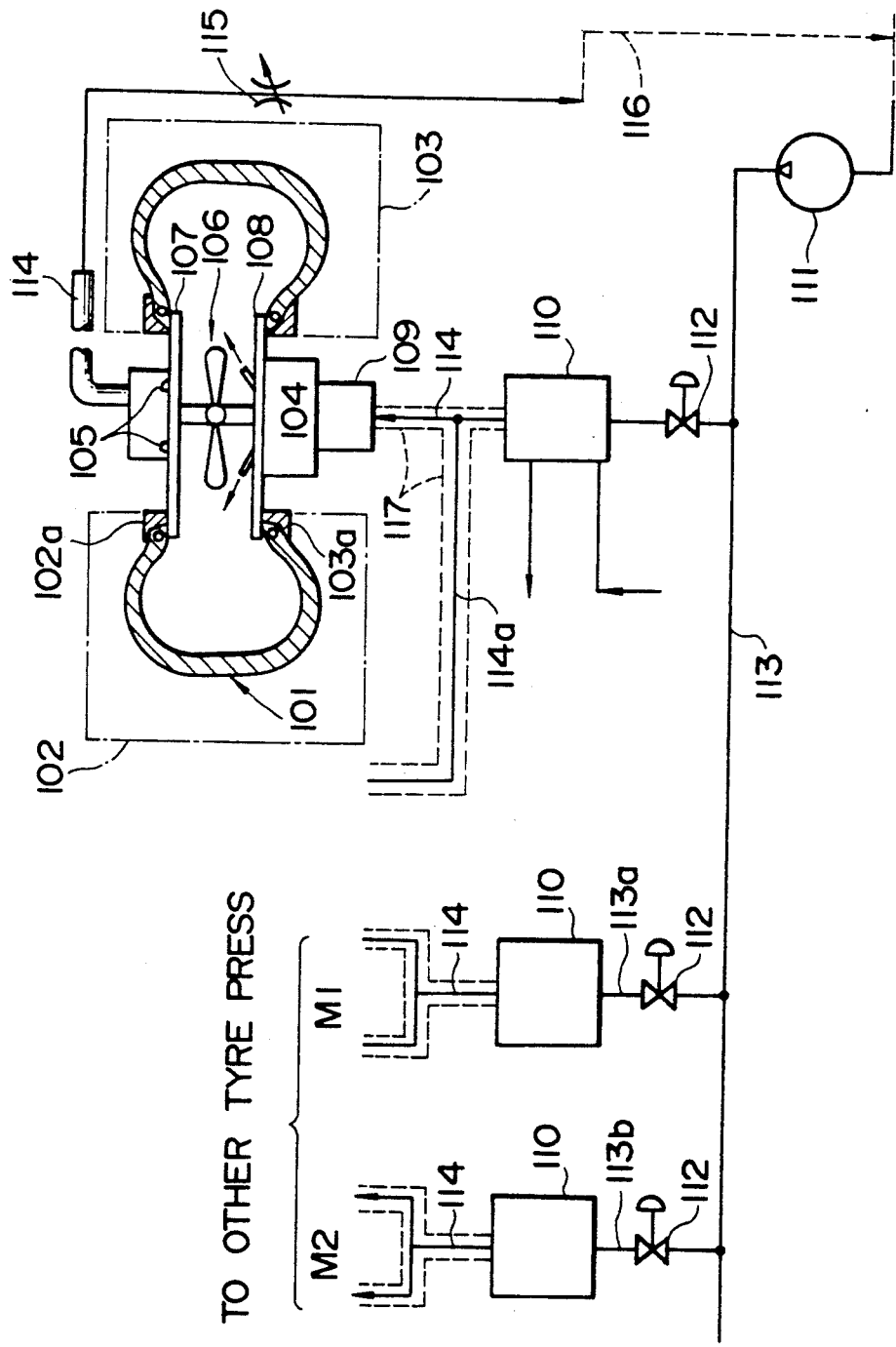
FIG. 3 is a block diagram of another embodiment of the tire vulcanizer.

In the embodiment shown in FIG. 3, the green tire 101 is charged into the movable upper half 102 and fixed lower half 103 of the split mold which can be opened and closed. In FIG. 3, numeral 102a denotes an upper bead ring supporting the upper bead section of the tire 101; numeral 103a denotes a lower bead ring supporting the lower bead section; numeral 107 expresses an upper supporting disc; and numeral 108 represents a lower supporting disc.

The supporting disc 108 is fixedly mounted on the top end of the center mechanism 109 arranged at the center of the lower half 103 of the vulcanizer mold, and the upper supporting disc 107 is held at a fixed spacing on the supporting disc 108 side. On these discs 107 and 108 are mounted an electric heater not illustrated and a sealing structure which hermetically seals by pressing the bead section of the green tire 101.

In the embodiment illustrated in FIG. 3, the inactive gas heating apparatus 110 is equipped for each vulcanizing press. For example, inside the base frame of the vulcanizing press not shown and outside the press (the exterior of mold) is installed a $CO_2$ or $N_2$ inactive gas heating apparatus 110. The $CO_2$ or $N_2$ inactive gas compressed to a specific pressure value by a compressor 111 is fed into the heating apparatus 110 through a supply line 113 in which a valve 112 is inserted, and then heated to at least the vulcanizing temperature prior to feeding into the enclosed space by such a heating means as a heat exchanger utilizing, for example, steam. This gas hot-press medium thus externally heated is injected out into the green tire 101 from supply ports 104 provided in the supporting disc 108 through the supply line 114 utilizing the center mechanism 109. Furthermore, the hot-press medium is positively stirred and circulated in the green tire 101 by means of the stirring-circulating means such as a fan 106 disposed between the upper and lower supporting discs 107 and 108, in such a manner that the hot-press medium may come into contact with the inner surface of the tire, thereby forming the green tire 101 through vulcanization together with the heating of the split mold.

The gas hot-press medium that has been continuously fed into the enclosed space, after being used for hot-pressing the tire 101, can be discharged out of the split mold through discharge ports 105 provided on the upper supporting disc 107 side, a discharge line 114 connected to the same discharge ports 105, and a throttle valve 115. In this case, a recovery line 116 is connected to the aforementioned compressor 111, enabling easy circulation for reuse of a recovery gas.

In FIG. 3, numeral 114a is a supply circuit branched off from a supply line 114, which is used for similarly supplying the gas hot-press medium to the other split mold of a twin-type mold comprising two sets of split molds in a vulcanizing press. Numeral 117 denotes a heat insulating and heat-retaining layer provided on the pipe line required. Accordingly, as shown in FIG. 3, the supply line 113 extending from the compressor 111 can be extended for connection of pipe lines 113a and 113b having a valve 112 for each of vulcanizing presses $M_1$ and $M_2$ to the center mechanism side of the tire vulcanizer. In this case, a large-capacity inactive gas heating apparatus 110 can be used when required.

Figure 4:
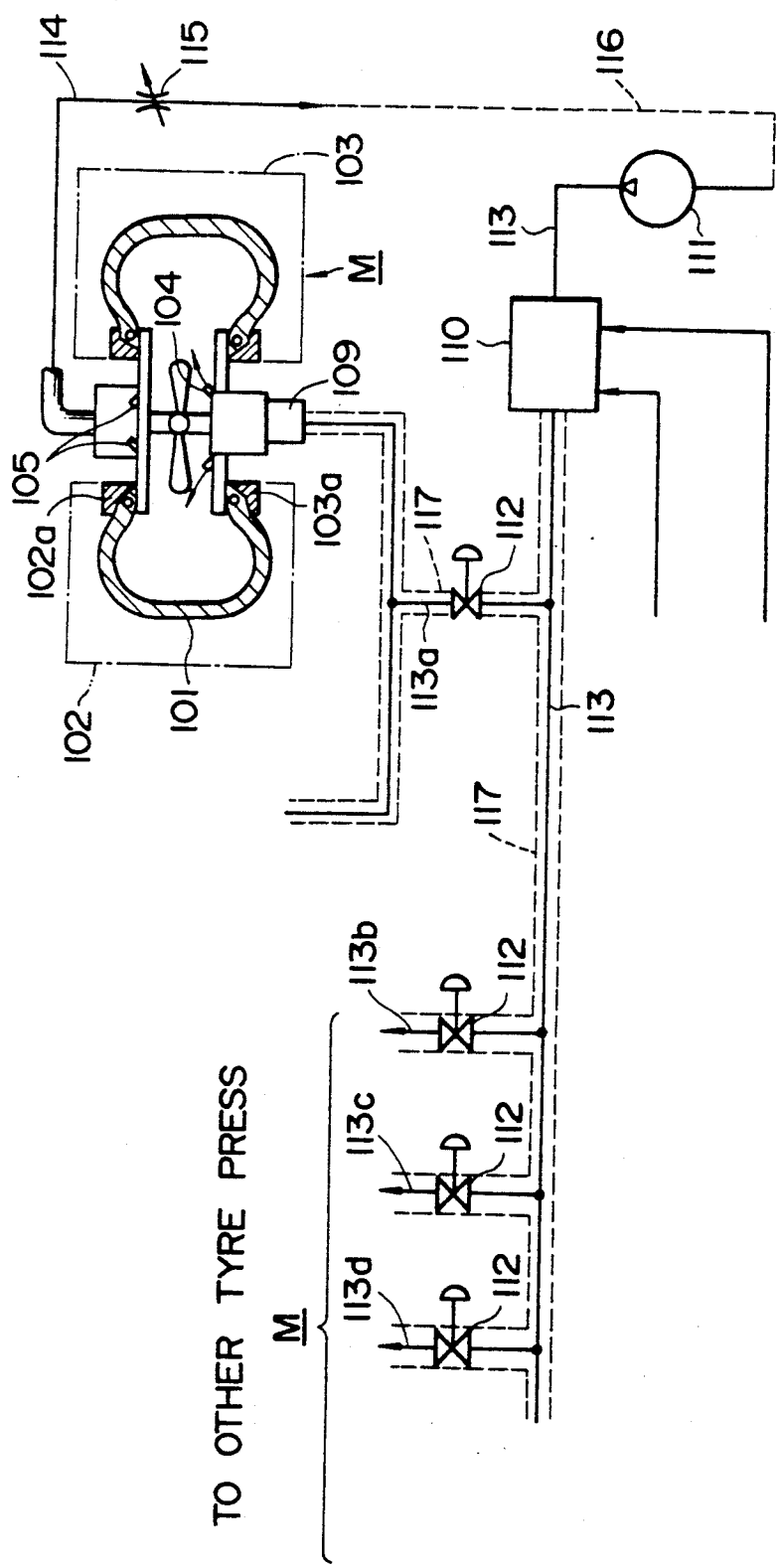
FIG. 4 is a block diagram of further another embodiment of the same.

In the embodiment shown in FIG. 4, one stand of gas heating apparatus 110 is provided separately from each vulcanizing press. An inactive gas pressure medium from the compressor 111 is sent to this heating apparatus 110, whereby the pressure medium is heated to the specific temperature of a hot-press medium, which then will be supplied to each vulcanizing press M side through branch lines 113a to 113d, each provided with a valve 112, which are branched off from a common supply line 113.

In the above-described embodiment of FIG. 3, the supply line 114 and the branch supply line 114a after the heating apparatus 110 are provided with heat-insulating and heat-retaining materials. In the embodiment shown in FIG. 4, the lines 113, 113a and 113b after the heating apparatus 110 are similarly provided with heat insulating and heat-retaining materials.

According to each embodiment of the present invention described above, it is possible for any type of the tire vulcanizers to perform the supply and circulation of a gas hot-press medium compressed to a desired pressure and heated up to a desired temperature by the heating apparatus 110 equipped outside of the mold, before feeding to the enclosed space including the green tire 101. The hot-press medium is also stirred for circulation of the hot-press medium for the purpose of heating the split mold as well as efficient accomplishment of vulcanization by applying both heat and pressure to the inside surface of the tire.

Particularly the stirring circulation of the supply hot-press medium requires only a small heat-capacity, high-temperature gas to enable the active inflow and outflow (circulation) of gas required for tire heating. Besides, as compared with conventional equipment using steam, the gas is easier to handle and safe. From this respect, the use of the hot-press medium has the advantages, in addition to the above-mentioned advantage, that it is possible to provide an effective space in the green tire 101, greater adaptability in the designing of hermetically sealed construction using a pressed seal in the tire bead section previously mentioned, usability of a larger-size pressed seal member whereby a firm sealed construction can be realized, and extremely simplified internal construction of molds for this type of vulcanizing presses. Furthermore, because the hot-press medium alone is employed for heating the tire from the inner surface thereof, there exists no such fear as the occurrence of radiant heat in the use of a heater, thereby ensuring uniform, safe and homogeneous vulcanization.

As has been described above in each embodiment according to the present invention, it is possible to equip each vulcanizing press with a gas heating apparatus or to use one independently mounted heating apparatus for common use. It is to be understood that the supply and discharge lines 113, 114 and 115, 116 should not be limited merely to the illustrated example, and also the construction and configuration of the supply ports 104, the discharge ports 105, and the fan 106 for stirring and circulation should not be limited only to the illustrated examples.

According to the present invention, the heater construction formerly used in a tire when vulcanized by means of a conventional bladderless-type tire vulcanizer can be dispensed with by using a gas as a hot-press medium, by heating the gas by a heating apparatus mounted outside of the split mold prior to supplying it into an enclosed space of a green tire, and by continuously and positively stirring and circulating the gas hot-press medium through the supply and discharge lines and the stirring and circulation means, hence enabling wide use of a narrow inner space of tire, facilitating the design of an important seal structure of the bead section, realizing the use of a large-size, sturdy construction required, and obtaining efficient, stabilized and homogeneous heating of the inner surface because of the effective stirring and circulation of the gas hot-press medium for heating, thereby easily obtaining excellent vulcanization quality. Furthermore, the required construction of the heating apparatus can be simplified and facilitated to a great extent.

Figure 5:
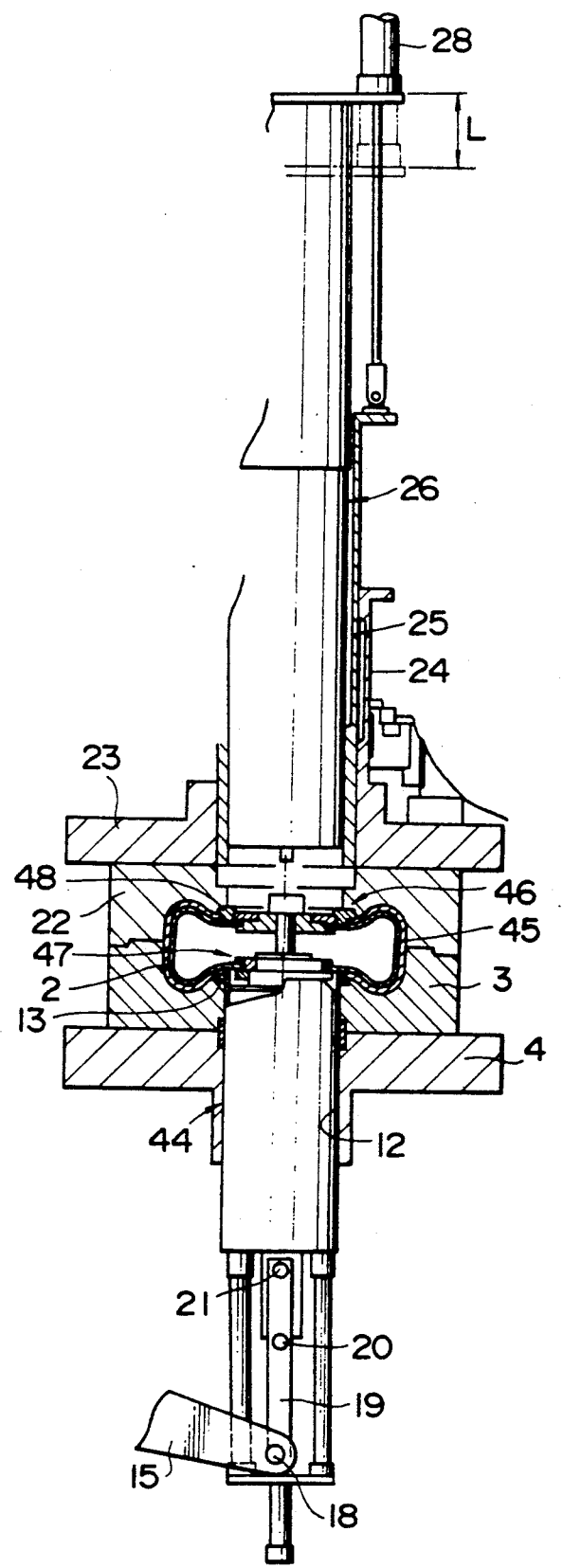
FIG. 5 is a sectional view showing the tire vulcanizer used as a bladder type vulcanizer.
Figure 7:
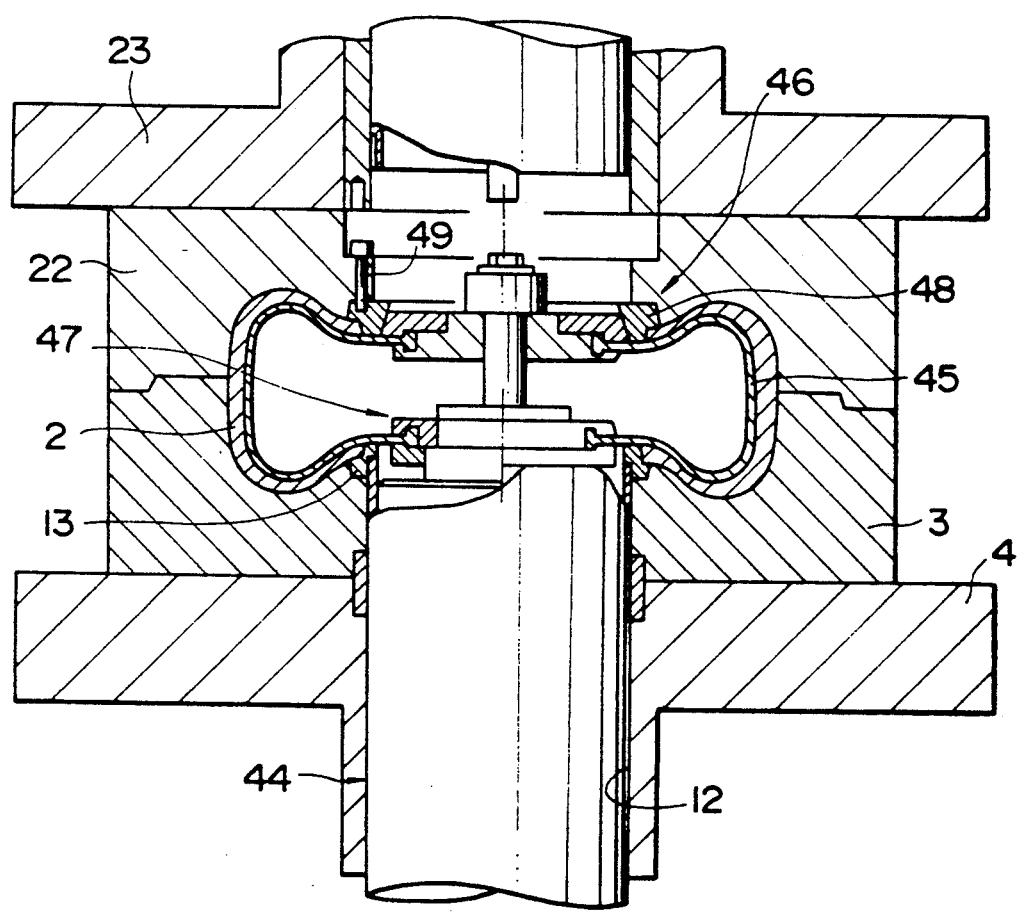
FIG. 7 is an enlarged view of a major portion of FIG. 3.

FIG. 5 shows the tire vulcanizer used as the bladder type. In FIG. 5, numeral 44 is the lower center mechanism of the bladder type, which is vertically movably and removably installed in the mounting hole 12 of the lower platen 4. This lower center mechanism 44 is connected to a link 19 by a bolt 21 inserted in an upper bolt hole. In the lower center mechanism 44, as shown in FIG. 7, an upper clamp ring 46 and a lower clamp ring 47 holding the upper and lower ends of a bladder 45 are vertically movably mounted. Also in the center of an upper half 22 of the mold is removably mounted an upper bead ring 48 for the bladder type by a bolt 49 in place of an upper bead ring 29 for the bladderless type.

Next, the method for using the bladder.bladderless dual-purpose tire vulcanizer will be explained. When this tire vulcanizer is to be used as the bladderless type, it is necessary, as shown in FIG. 1, to mount the lower center mechanism 11 for the bladderless type to the lower platen 4, and to lower the upper center mechanism 26 for the bladderless type on the upper platen 23 side as low as the operating position by means of the cylinder 28. Then the upper and lower beads of the green tire 2 is held under pressure between the upper and lower bead rings 29 and 13 and the upper and lower sector plates 30 and 14 of the upper and lower center mechanisms 26 and 11. After the upper and lower halves 22 and 3 of the mold are clamped, the hot-press medium is charged into the green tire 2 for direct vulcanization of the tire. In this case the lower bead ring 13 is usable for both the bladder and bladderless types, while the upper bead ring 29 to be used is exclusively for the bladderless type.

When the vulcanized tire is detached off, and taken out of, the lower half 3, the lower center mechanism 11 is raised by the cylinder 17 through the lift arm 15.

Next, when the tire vulcanizer is to be used as the bladder type, first the upper platen 23 side is raised as high as the upper limit of its upward stroke. Then, the lower center mechanism 11 for the bladderless type is pulled out upwardly from the mounting bore 12 of the lower platen 4, and the lower center mechanism 44 for the bladder type is inserted from above into this mounting bore 12. In this case, the lower center mechanism 44 for the bladder type to be inserted must be of the same outside diameter as that for the bladderless type, considering the size of the mounting bore 12. The link 19 and the lower center mechanism 44 are connected by the bolt 21 inserted in the upper bolt hole 20 of the link 15. This operation is required because the mounting position of the lower center mechanism 44 for the bladder type and the link 19 differs from that of the lower center mechanism 11 for the bladderless type.

Figure 6:
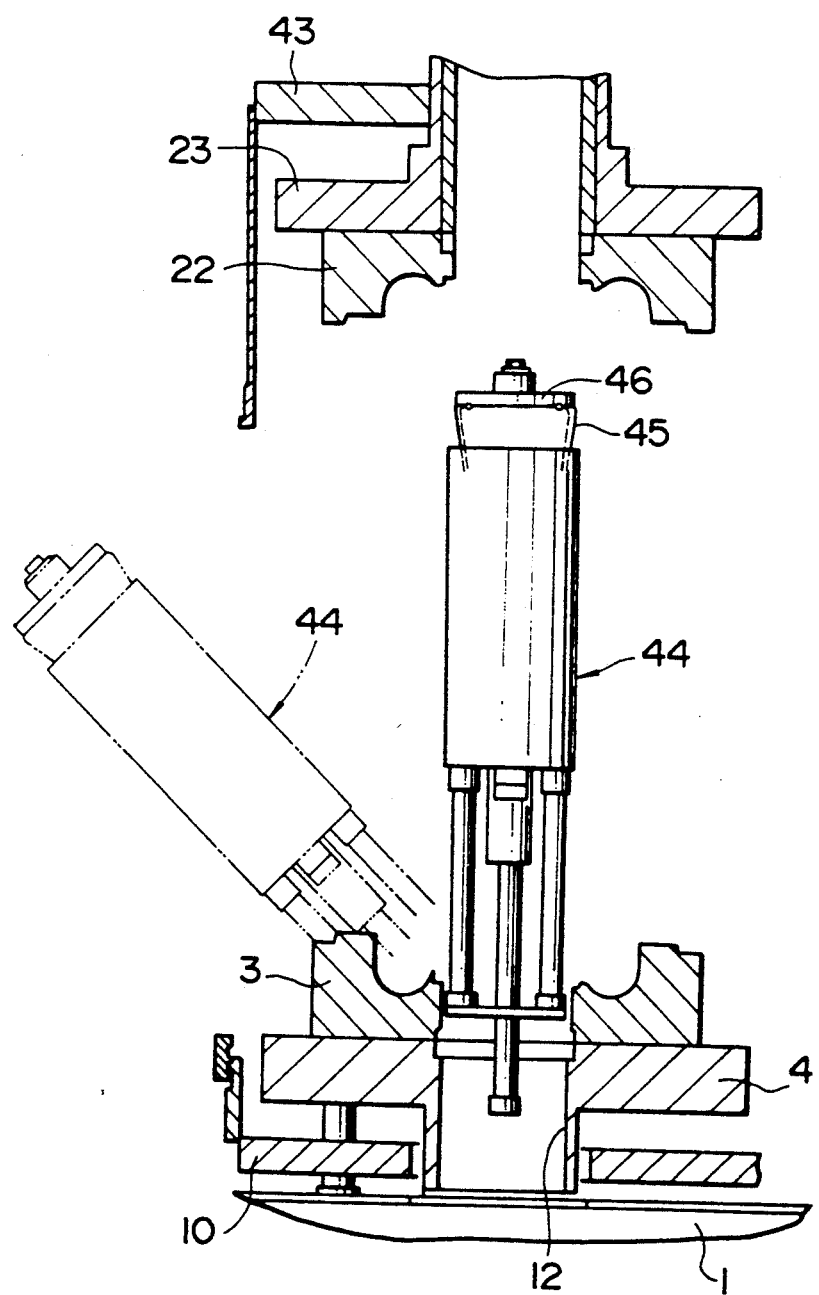
FIG. 6 is an explanatory view thereof.

If the mold does not open wide enough to take out the vulcanized tire the lower center mechanism 44 may be inclined to allow easy removal of the work as shown in FIG. 6.

In the meantime, since the upper center mechanism 26 is not required, the upper sector plate 30 is removed after removal of the nut 40, and then the upper bead ring 29 is detached. Then, the upper center mechanism 26 is raised by the size L up to the upper waiting position above the bottom end of the upper platen 23, by means of the cylinder 28. Subsequently, the upper bead ring 13 for the bladder type is attached to the upper half 22 in place of the upper bead ring 29 that has been removed. The lower bead ring 13 is usable for both the bladder and bladderless types, so that, therefore, the tire vulcanizer can be switched from the bladderless type to the bladder type for vulcanizing the green tire 2 by the use of the bladder 45 as shown in FIG. 4.

In the embodiments described above, the tire vulcanizer with the bladderless type changed over to the bladder type has been described in detail. Reversely the bladder type can be changed to the bladderless type by reversing the procedure described above.

The lower bead ring 13 of special type either for the bladder type or for the bladderless type may be used.

According to the present invention, a lower center mechanism 44 for the bladder type and a lower center mechanism 11 for the bladderless type are interchangeably mounted on a lower platen 4 supporting a lower half 3 of the mold; an upper center mechanism 26 for the bladderless type is vertically movably mounted, between an operating position and an upper waiting position, on an upper plate 23 supporting an upper half 22 of the mold; and on the upper half 22 are interchangeably mounted an upper bead ring 48 for the bladder type and an upper bead ring 29 for the bladderless type. It is, therefore, possible to make a changeover between the bladder type and the bladderless type economically by replacing the lower center mechanism 11 and 44 and also by replacing the upper bead rings 29 with the upper center mechanism 26 raised.

While only certain embodiments of the present invention have been described, it will be apparent to those skilled in the art that various changes and modifications may be made therein without departing from the spirit and scope of the present invention as claimed.

What is claimed is:

1. A dual purpose tire vulcanizer operable both with a bladder and without a bladder, comprising:
    a lower platen supporting a lower mold half;
    a bladder type lower center mechanism having upper and lower bladder clamping rings for clamping a bladder therebetween;
    a bladderless type lower center mechanism having lower bead clamping means;
    means for selectively mounting one of said bladder type and said bladderless type center mechanisms to said lower platen;
    an upper platen supporting an upper mold half;
    an upper center mechanism mounted for vertical movement relative to said upper platen;
    bladderless type bead clamping means releasably mounted to said upper center mechanism; and
    means for moving said upper center mechanisms between a lower operating position and an upper waiting position.

2. The tire vulcanizer of claim 1, wherein said bead clamping means includes a lower bead ring.

3. The tire vulcanizer of claim 1, including upper and lower domes enclosing the upper and lower platens, wherein said upper and lower platens are clamped relative to said upper and lower domes.

* * * * *